(No Model.) 2 Sheets—Sheet 1.
G. E. HENRY.
SUCCESSIVE DRIVE MECHANISM FOR MACHINES IN SERIES.
No. 569,414. Patented Oct. 13, 1896.
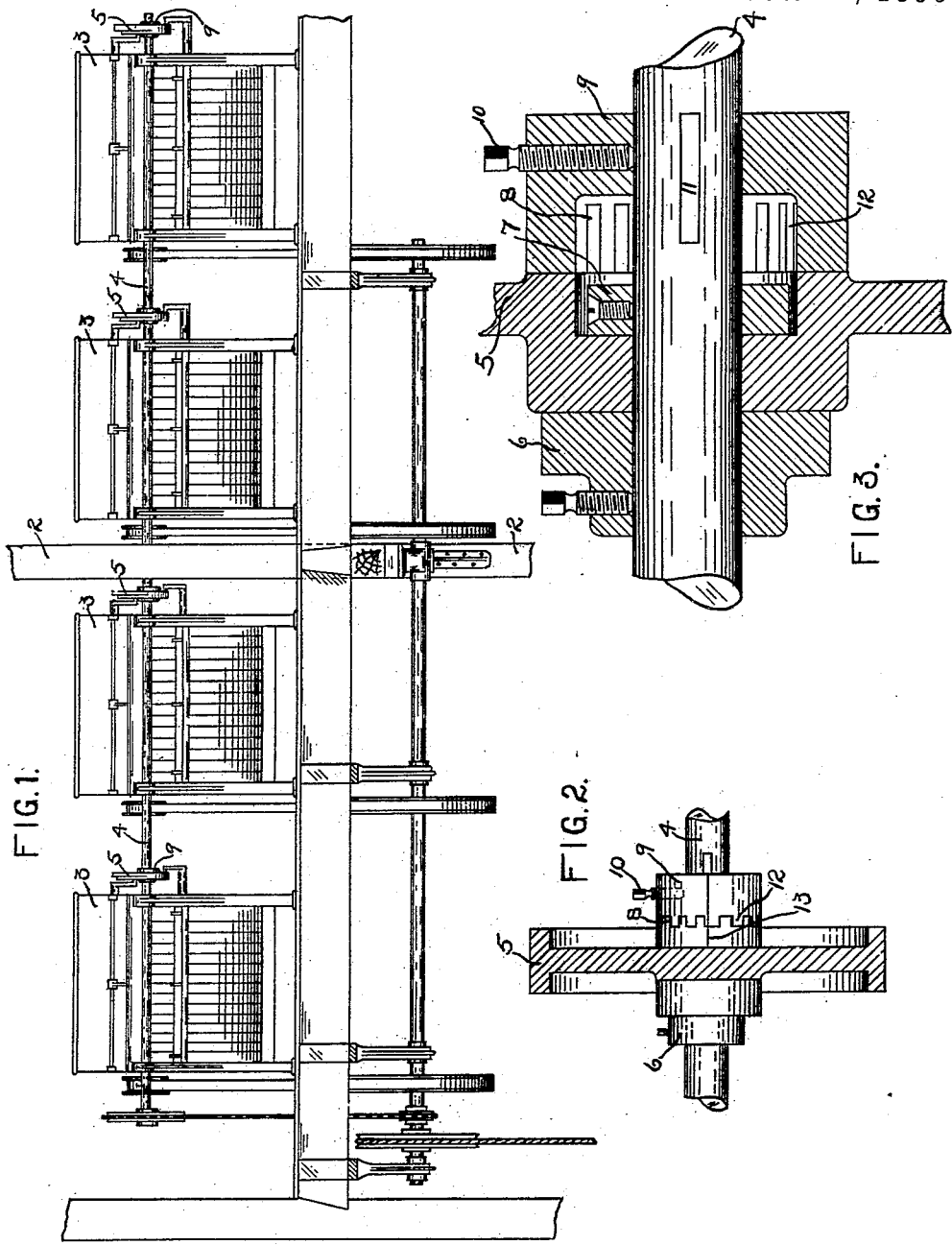
WITNESSES:
Horace B Jones
Zula Green
INVENTOR
George E. Henry
BY
V H Lockwood
ATTORNEY.

(No Model.) 2 Sheets—Sheet 2.

G. E. HENRY.
SUCCESSIVE DRIVE MECHANISM FOR MACHINES IN SERIES.

No. 569,414. Patented Oct. 13, 1896.

WITNESSES:
Horace B. Jones
Zula Green

INVENTOR
George E. Henry
BY
V H Lockwood
ATTORNEY.

UNITED STATES PATENT OFFICE.

GEORGE E. HENRY, OF TERRE HAUTE, INDIANA.

SUCCESSIVE DRIVE MECHANISM FOR MACHINES IN SERIES.

SPECIFICATION forming part of Letters Patent No. 569,414, dated October 13, 1896.

Application filed April 22, 1896. Serial No. 588,681. (No model.)

*To all whom it may concern:*

Be it known that I, GEORGE E. HENRY, of Terre Haute, county of Vigo and State of Indiana, have invented certain new and useful Successive Drive Mechanism for Machines in Series; and I do hereby declare that the following is a full, clear, and exact description thereof, reference being had to the accompanying drawings, in which like letters refer to like parts.

My invention relates to a mechanism for operating from one shaft a series of mechanisms intermittently, so that they will work *seriatim*, one beginning to work when another has finished. In such case, since no two of the mechanisms are operated simultaneously, a small amount of power will suffice to actuate a large number of such mechanisms, and all racing, jerking, and straining due to such irregular working are avoided. I have employed this device heretofore in operating the feed mechanisms of a series of hominy-mills, and it is here shown in combination with them. It can, however, be employed with any other kind of machine working under similar conditions. Its nature will be understood from the drawings and the following description and claims.

Figure 5:
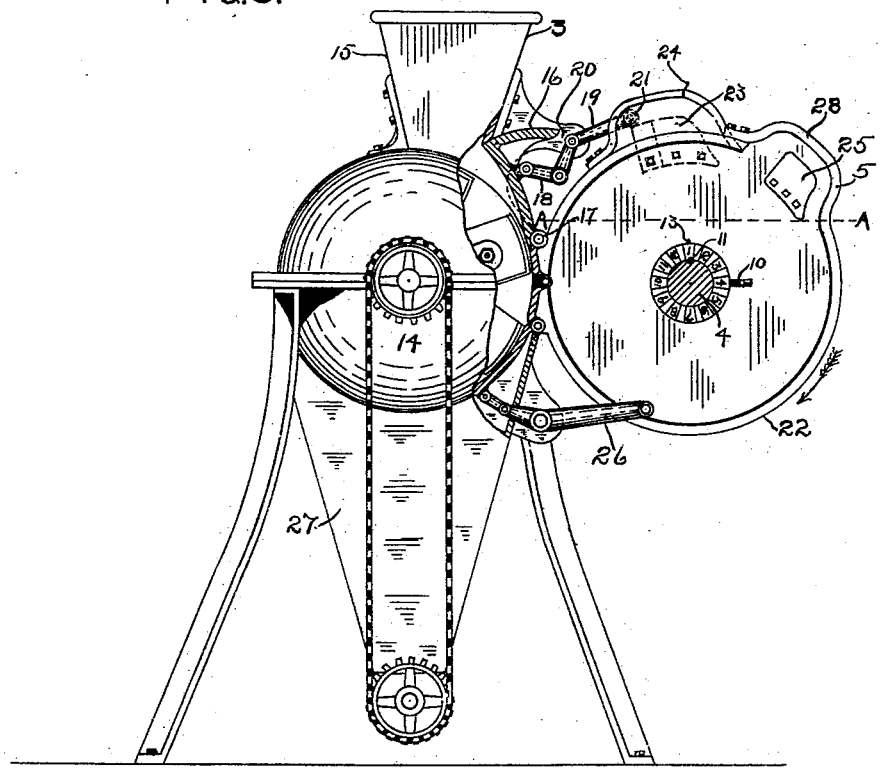
Figure 4:
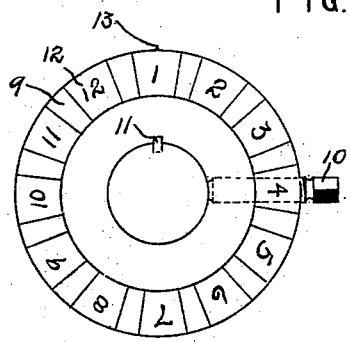

Figure 1 is a section of a hominy-mill, showing a series of four degerminators and means for driving them. Fig. 2 is a detail of my device, the driving-wheel being shown in section on the line A A of Fig. 5. Fig. 3 is a longitudinal section of the clutch mechanism. Fig. 4 is an elevation of the inner face of the clutch. Fig. 5 is an end elevation of the degerminator and feed drive mechanism with the counter-shaft in section.

I show in Fig. 1 a section of the mill-floor and some posts 2. Beneath the floor is seen the shafting for transmitting power from any suitable source to the degerminators 3. Above the floor and alongside the degerminators is a counter-shaft 4, driven also by the shafting below the floor and carrying a series of drive-wheels or cam-disks 5, that operate the charging and discharging mechanisms of the degerminators.

The casing 14 of the degerminators is provided with charging and discharging orifices, as usual. The charging-orifice is below the hopper 15, and is closed by a gate or door 16, hinged at 17 and operated by the links 18, being connected up with the bell-crank 19, that is pivoted to the bracket 20. The bell-crank on its free end has a lateral pin 21, that engages the laterally-extending rim 22 on its inner periphery, as shown. The "charging" mechanism, as this is called, which I have just described is operated by the cam 23, located on the extension 24 of the wheel 5. The pin 21 of the bell-crank 19 rides over the cam 23, thereby causing the charing mechanism to open the gate 16 and enable the corn in the hopper 15 to enter the cylinder.

The rim 22 of the wheel 5 is on both sides, as seen in Fig. 2. The cam 23 for operating the charging mechanism is placed on one side of the disk 5, while the cam 25 is placed on the other side and engages and actuates the lever 26, that is connected up with the discharging-door hinged to the bottom of the degerminator-casing in the usual manner. This lever 26 is also provided with a pin that engages the rim of the wheel 5.

The rim of the wheel keeps the discharging-door closed, excepting when the lever 26 is forced downward by the cam 25, then the door is opened and the hominy discharged into the chute 27. In order to provide for this movement of the lever 26, there is an extension 28 on the wheel 5, on the side of which is secured the cam 25. The wheel 5 rotates in the direction of the arrow. In operating such degerminators they are charged or filled with corn, which is treated about fifteen seconds, and then discharged. The diameter of the wheel is made such and the cams of such size and so located on them, in the full-sized machine, as to bring about the desired periods for the treatment of the corn and the charging and discharging of the mill. If the periods are provided as above stated, about 5 seconds are required to discharge the degerminator and get a new supply. During these five seconds the discharging and charging mechanism is operated, while during the remaining fifteen seconds it is not operated, and the wheel 5 runs idle, that is, the wheel 5 rotates continually, but the cams thereon engage the link-and-lever mechanism for opening the charging and discharging gates or doors for only about one-fourth of the time required for the wheel to rotate once.

Since, therefore, the separate cam-wheels that actuate the charging and discharging mechanisms in the machines I show work only one-fourth of the time and run idle the remaining time, it is my plan to operate four sets of them from one counter-shaft, so that they will do the work in succession. One cam-wheel begins work as soon as its predecessor ends, and after five seconds it quits work and the next works five seconds, and so on in series. As soon as the last one in the series quits working the first begins. In this way only one of the four cam-wheels is working at any one instant, and therefore I am enabled to drive them with one-fourth of the power that would be required if they all four worked simultaneously or without any relative regularity.

To effect the result above explained, I mount the cam-wheel 5 loosely on the shaft 4 between the outside collar 6 and the inside collar 7. The hub of the wheel 5 is cored out to receive the collar 7, and the cored end of the hub is provided with teeth 8. Where four mechanisms work intermittently, as above described, the number of teeth should be four or some multiple of four. I show twelve. To drive this wheel or disk 5, I secure the clutch 9 on the shaft 4. The set-screw 10 prevents its longitudinal movement while at work, and the key 11 prevents its rotary movement. The clutch is provided on its inner end with a series of teeth 12 exactly like those on the hub of the cam-wheel 5, and the teeth of the two engage each other and interlock. The teeth on the clutch, as seen in Fig. 4, are numbered consecutively, and the spaces between the teeth on the wheel are similarly numbered on the inside. The number on any may be reversed and altered as long as they are similar. On the wheel I make a gage-mark 13, that registers with the key 11 when the wheels are set at the numeral "1."

I adjust the couplings of the clutch mechanism to suit the periods of time during which the cam-wheels are desired to run idle. In the system shown in the drawings I mount the clutches so they register with each other and then I set one wheel so its gage-mark will register with "3" on its clutch and the second wheel so its gage-mark will register with "6" on its clutch and the third and fourth wheels so they will register with "9" and "12" on their clutches, respectively. It is clear when such cam disks or wheels 5 are set as just described that the cams on them will operate in succession, say for five seconds each, and during the rest of the time the wheels run idle. In this way, since such wheels work only one-fourth of the time and run idle three-fourths of the time and all work in succession, the work of the shaft 4 will be uniform and continuous, the same as if it were driving one continuously-working wheel, and hence there would not be the racing, jerking, and straining which are always incident to a shaft that carries a wheel that works only a portion of the time, and power sufficient to drive one wheel that works continuously will drive four which are set as described to work in succession, and only one-fourth of the power will suffice that would otherwise be required if the four wheels were not so set.

The device is reset by loosening the set-screw 10, slipping the clutch back, rotating the wheel 4 until the desired numerals register with each other, and then replacing the clutch and tightening it. Of course the number of cam-wheels 5 or the period during which each works or the nature of the intermittently-actuated mechanisms to be driven or the means of driving such mechanism from the cam-wheels can be varied to suit the work or machines needed, but the principle would be the same as in the case above described, and this is true whether the intermittently-operating cam-wheel or other similarly-operating means for transmitting power at intervals.

What I claim as my invention, and desire to secure by Letters Patent, is—

1. The combination with a series of mechanisms to be actuated, of a shaft extending alongside the same, means for driving it, a wheel mounted on the shaft opposite each mechanism to be operated, an actuating-cam on each wheel out of line with the cams on all the other wheels, and a link-and-lever connection between the cams and the mechanisms to be actuated, whereby the latter will operate in succession.

2. The combination with a series of mechanisms to be actuated, of a shaft extending alongside the same, means for driving it, a wheel loosely mounted on the shaft opposite each mechanism to be operated and having a toothed hub, clutches secured to the shaft having teeth to engage the teeth of the wheel-hubs, an actuating-cam on each wheel, and a link-and-lever connection between the cam and the mechanisms to be actuated, whereby the wheels may be so set that the cams will be out of line with each other.

3. The combination with a series of mechanisms to be actuated, of a shaft extending alongside the same, means for driving it, a wheel loosely mounted on the shaft opposite each mechanism to be operated and having its hub toothed at one end clutches adjustably secured to the shaft having teeth to engage those of the wheel-hub, the teeth of the one and the spaces between the teeth of the other being numbered, an actuating-cam on each wheel, and a link-and-lever connection between the cams and the mechanisms to be actuated, whereby the wheels may be so set on the shaft as to actuate such mechanisms in succession.

In witness whereof I have hereunto set my hand this 24th day of March, 1896.

GEORGE E. HENRY.

Witnesses:
FRANK. P. SCOTT,
JOHN BETTCHER.